Aug. 2, 1949.　　　　G. H. LELAND　　　　2,477,934
BORING MACHINE

Filed Sept. 15, 1945　　　　　　　　　　　　4 Sheets-Sheet 1

INVENTOR
GEORGE H. LELAND
BY
ATTORNEY

Aug. 2, 1949.　　　　G. H. LELAND　　　　2,477,934
BORING MACHINE
Filed Sept. 15, 1945　　　　　　　　　　　4 Sheets-Sheet 3

INVENTOR.
GEORGE H. LELAND
BY
*Edward Reed*

Aug. 2, 1949.  G. H. LELAND  2,477,934
BORING MACHINE
Filed Sept. 15, 1945  4 Sheets-Sheet 4
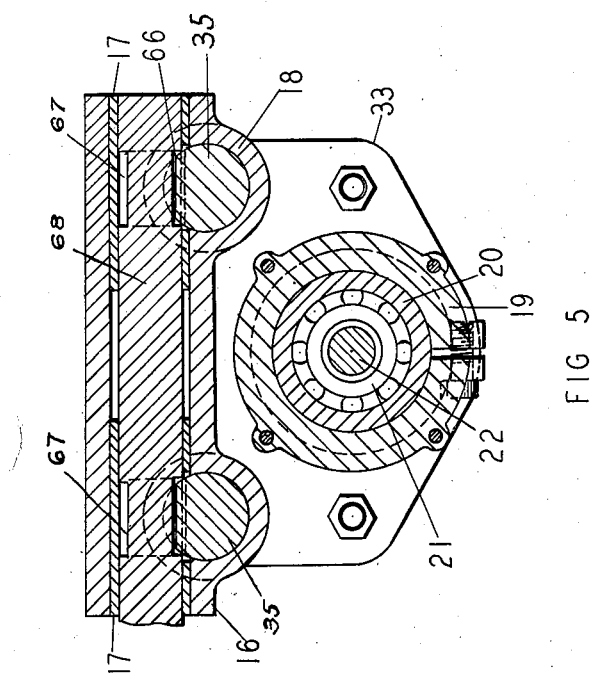
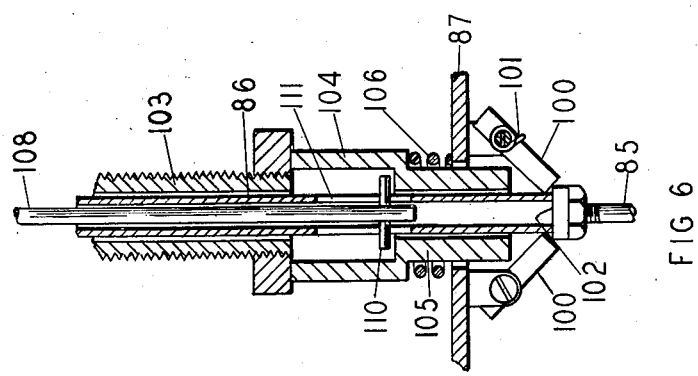
INVENTOR.
GEORGE H. LELAND
BY Patented Aug. 2, 1949

2,477,934

UNITED STATES PATENT OFFICE 2,477,934

BORING MACHINE

George H. Leland, Dayton, Ohio

Application September 15, 1945, Serial No. 616,525

7 Claims. (Cl. 77—4)

This invention relates to boring machines and the like and is designed more particularly for high speed precision work.

One object of the invention is to provide a high speed boring machine capable of effecting a boring operation in conformance with the extremely close tolerances and with which successive bores will be identical in all respects.

A further object of the invention is to provide such a machine in which the relative axial movement of the work piece and the tool during the boring operation is automatically controlled to effect such movement at a predetermined uniform speed, and the work piece is maintained in true axial alinement with the tool during such movement.

A further object of the invention is to provide such a machine in which the boring tool and work piece are positively held against vibration or lateral deflection during the boring operation.

A further object of the invention is to provide such a machine in which the tool is held against axial movement and the work piece is moved into engagement with the rotating tool.

A further object of the invention is to provide such a machine in which the work piece is rigidly held between a work support and a work engaging and positioning member as it is moved into engagement with the tool.

A further object of the invention is to provide such a machine which will quickly move the work piece into firm engagement with the engaging member and will then move the engaging member, work support and work piece more slowly during the boring operation.

A further object of the invention is to provide such a machine which is self-contained and automatic in operation.

A further object of the invention is to provide such a machine having adjustable means to properly time the operations thereof.

Other objects of the invention may appear as the mechanism is described in detail.

Figure 1:
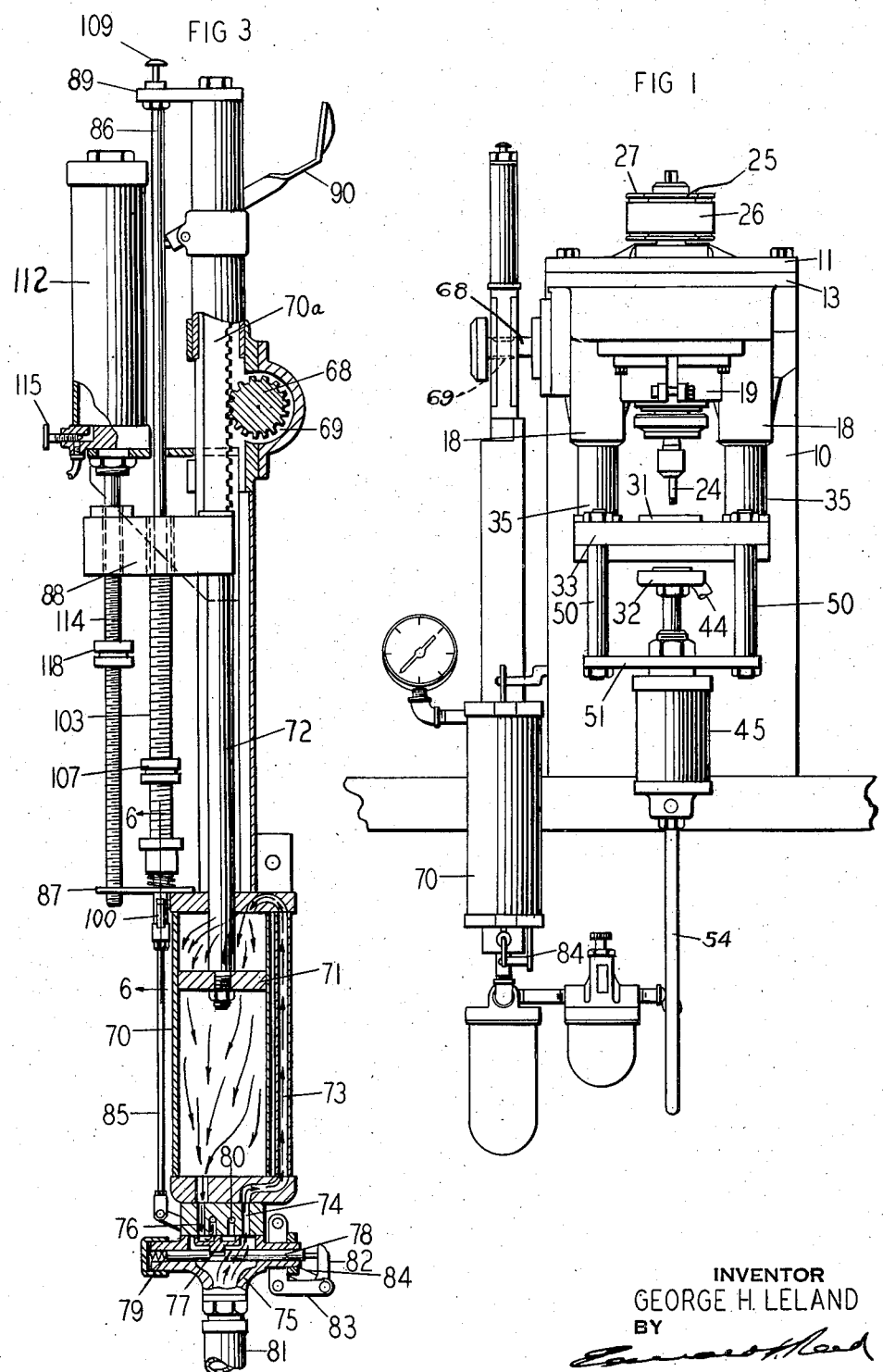
Figure 2:
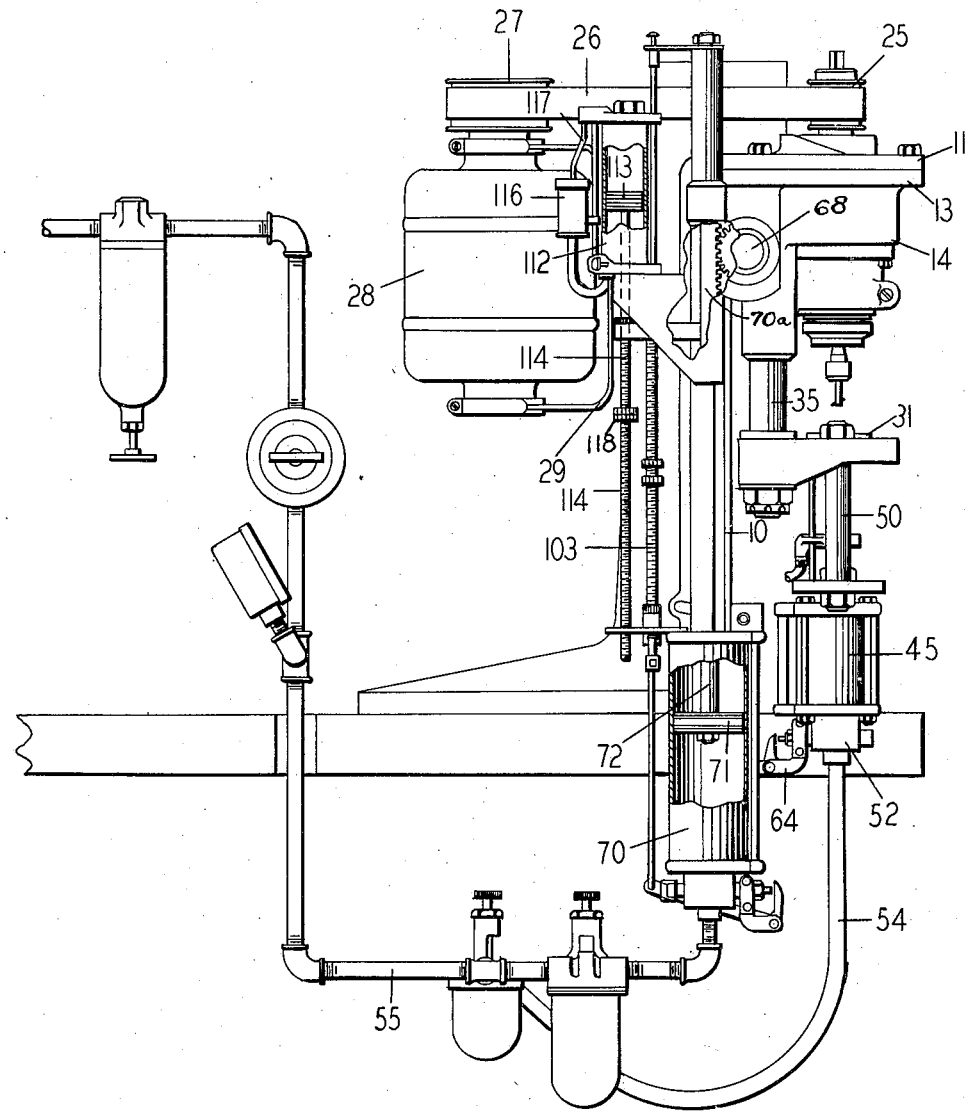
Figure 4:
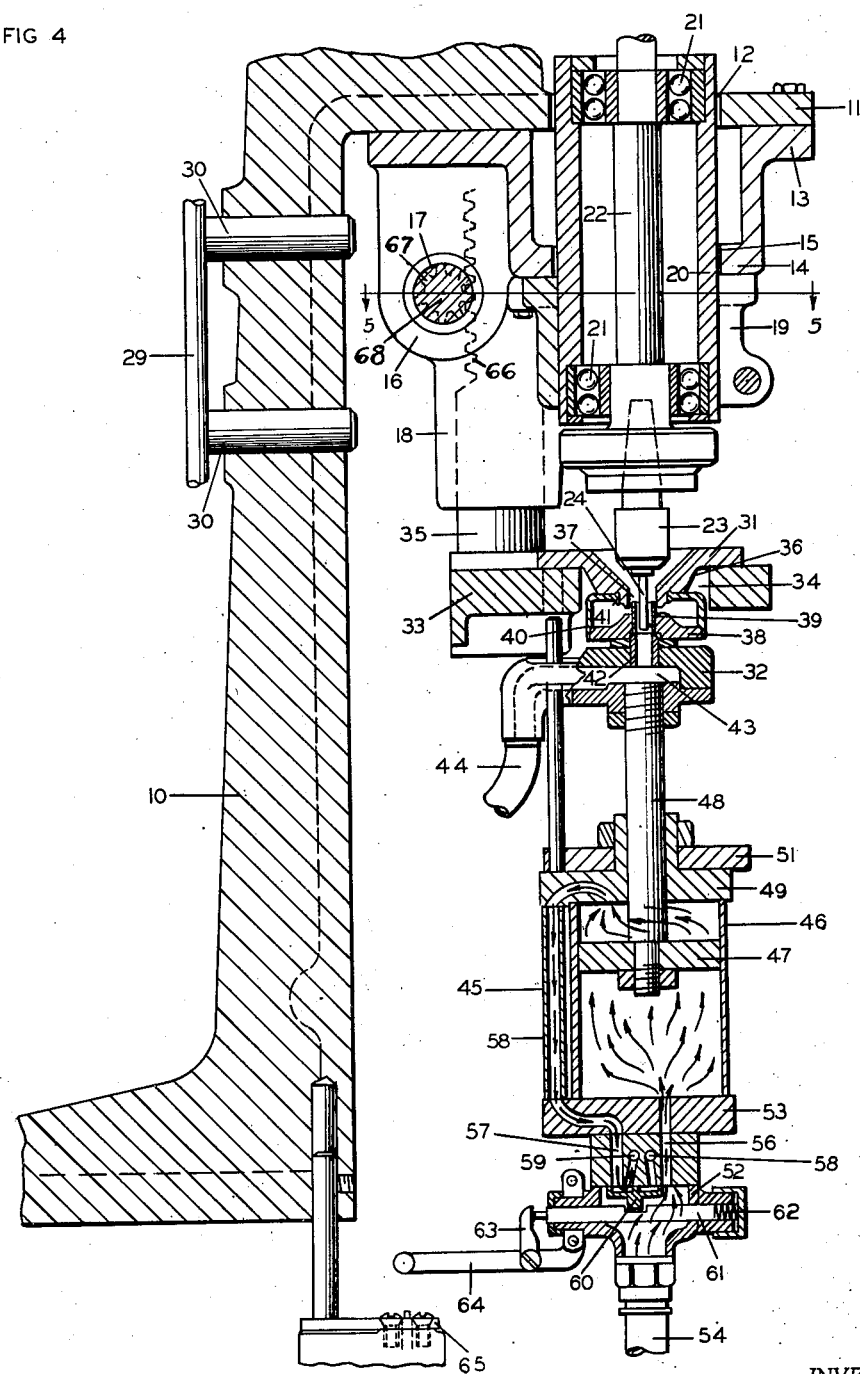

In the accompanying drawings Fig. 1 is a front elevation of a machine embodying my invention; Fig. 2 is a side elevation of such a machine, partly in section; Fig. 3 is an enlarged side elevation, partly in section, of the operating mechanism for moving the work piece into engagement with the tool; Fig. 4 is a sectional view, partly broken away, of the mechanism for moving the work support and work piece into engagement with the work engaging member; Fig. 5 is a transverse sectional view taken on the line 5—5 of Fig. 4; and Fig. 6 is a sectional detail view of the controlling device for the valve actuating rod.

In these drawings I have illustrated one embodiment of my invention and have shown the same as a boring machine but it will be understood that the invention may take various forms and may be utilized with tools other than boring tools.

In the illustrated embodiment the machine comprises a supporting structure here shown as an upright standard 10 having at its upper end a forwardly extending part 11, provided with an opening 12. Rigidly connected with and arranged below the part 11 of the supporting structure is a member 13 having a depressed portion 14 provided with an opening 15 in line with the opening 12. Rigidly supported by the member 13 and preferably formed integral with the rear portion thereof is a downwardly extending part 16 provided with bearings 17 and two laterally spaced downwardly extending tubular members 18, the bores of which constitute guideways. Rigidly secured to and arranged beneath the depressed portion 14 of the member 13 is a split collar 19 in which is rigidly mounted a bearing which, in the present instance, comprises a tubular element 20 provided at its respective ends with ball bearings 21. Rotatably mounted in these bearings is a vertical spindle 22 which is firmly held against axial movement, lateral deflection or vibration with relation to the bearing structure in a known manner and is provided at its lower end with means, such as a chuck 23, whereby a tool 24 may be connected therewith, the tool being here shown as a boring tool. The spindle may be driven in any suitable manner and, in the present instance, it extends upwardly beyond the part 11 of the supporting structure and is provided with a pulley 25 which is connected by a belt 26 with a pulley 27 on the shaft of an electric motor 28. The motor may be mounted on the supporting structure in any suitable manner and is here shown as mounted in a frame comprising a U-shaped member 29 which may be rigidly secured to the supporting structure in any suitable manner, as by studs 30.

A suitable work support is arranged beneath the spindle for movement toward the latter with the work piece in line with the spindle. The work piece may be held in a fixed position on the work support in any suitable manner but I prefer to interpose between the work support and the tool on the spindle a movable work engaging member which is spaced from the work support when the latter is in a retracted position, so that the work piece may be placed on the work support and the work support then actuated to move the work piece into engagement with the work engaging member, thereby clamping the work piece firmly on the work support, and the work engaging member then moved with the work support toward the spindle.

In the arrangement here illustrated the work engaging member 31 is supported beneath and in line with the spindle for movement toward and from the same, and arranged beneath the work engaging member is a work support 32 which is movable toward and from the spindle simultaneously with the work engaging member and is also movable toward and from the work engaging member. The work engaging member 31 may be of any suitable character, this depending in part on the character of the work piece to be bored or otherwise operated upon. In the present instance it is mounted on a supporting plate 33 having an opening 34. Rigidly secured to the plate 33 are upwardly extending members or bars 35 which are slidably mounted in the respective tubular members 18 and are actuated in a manner to be hereinafter described to move the engaging member 31 toward and from the spindle, the bars having snug running fit in the guideways in the tubular members to prevent vibration or lateral deflection of the work engaging member. In the present arrangement the engaging member 31 is formed with a conical portion 36 extending downwardly therefrom into the opening 34 in the plate 33 and is provided at its apex with an opening 37 through which the tool 24 may extend. The member 31 is also provided with a part to engage and center the work piece with relation to the tool. The work piece here shown comprises an apertured base 38 into which is pressed a bushing 39 which is to be bored. This bushing extends upwardly beyond the base and is of such an outside diameter that it may enter the opening 37 in the engaging member 31. Rigidly secured to the base 38 is a cup-shaped shell 40 having a central aperture in the upper wall thereof. The conical portion 36 of the engaging member is provided with an annular part 41 adapted to enter the aperture in the shell and accurately position the work piece with relation to the engaging member and the tool. The work piece may be centered on the work support 32 in any suitable manner and, in the present instance, the base 38 of the work piece is provided with a recess into which extends a bushing 42 mounted in the upper portion of the work support. In the present instance, the work support is provided with a cavity 43 to receive the cuttings removed from the work piece by the tool and this cavity is provided with an air conduit 44 by means of which it may be connected with a suction apparatus to remove the cuttings in a well known manner.

The work support 32 may be moved toward and from the work engaging member 31 in any suitable manner. In the present instance, an actuating device 45 is arranged beneath the work support and is connected with the work engaging member for movement therewith. This actuating device is shown as a fluid actuated device and comprises a vertical cylinder 46 in which is mounted a piston 47 having a piston rod 48 extending above the upper head 49 of the cylinder and with which the work support 32 is connected. The cylinder is connected with the work engaging member by tie rods 50 which extend through the bar 51 secured to the upper head of the cylinder and through the plate 33 of the work engaging member. Thus when the work engaging member 31 is actuated the cylinder and work support move therewith and the work support is movable by the piston 47 toward and from the work engaging member. The fluid operated device 45, which actuates the work support, is preferably reversible and in the present instance a valve casing 52 is connected with the lower head 53 of the cylinder and with a flexible conduit 54 which is connected with a pipe 55 leading to a source of air under pressure. A passage 56 leads from the chamber within the valve casing to the cylinder below the piston and a second passage 57 leads from the valve chamber through a conduit 58 to the cylinder above the piston. The valve chamber is also provided with exhaust ports 58 and 59. A slide valve 60 mounted in the valve chamber is operated by a rod 61. A spring 62 acts on the rod 61 to hold the valve 60 in a position, shown in Fig. 4, in which the valve chamber is directly connected with the lower portion of the cylinder and the upper portion of the cylinder is connected through the conduit 58 and passage 57 with the exhaust port 59. The valve is actuated to move the same to its reverse position by a finger 63 carried by a pivoted arm 64 and so arranged that the upward movement of the arm about its pivotal axis will move the rod and the valve to the right in Fig. 4 and thus connect the valve chamber with the upper end of the cylinder and connect the lower end of the cylinder through the valve member with the exhaust port 58. When the cylinder is moved to its lowermost position the arm 64 engages a part 65 fixed with relation to the supporting structure and is moved thereby to reverse the position of the valve and thus connect the source of air supply with the upper end of the cylinder to move the piston and the work support downwardly. Upon the initial upward movement of the cylinder the arm 64 moves out of engagement with the part 65 and the spring 62 shifts the valve to admit air to the cylinder below the piston and thus quickly move the work piece on the work support into engagement with the work engaging member 31.

The slide bars 35 may be actuated in any suitable manner to move the work engaging member, the work support and the actuating device for the latter simultaneously toward the spindle. In the present arrangement the upper portions of the slide bars 35 are provided with teeth 66 to form rack bars which mesh with pinions 67 on a shaft 68 journaled in the bearings 17. A second pinion 69 on the shaft 68 meshes with a rack bar 70a which is connected with a second actuating device which is fixed with relation to the supporting structure. Preferably this actuating device is similar to the actuating device for the work support and it is shown as comprising a cylinder 70 having mounted therein a piston 71 which is connected by a piston rod 72 with the rack bar 70a. The upper portion of the cylinder is connected through a conduit 73 and passage 74 with the valve chamber within a casing 75 and this valve chamber is connected through a passage 76 with the lower portion of the cylinder, these connections being controlled by a slide valve 77 and a valve rod 78. A spring 79 tends to move the valve to a position in which the air is admitted through the passage 76 directly to the lower portion of the cylinder and the air from the upper portion of the cylinder is exhausted through the conduit 73, passage 74 and exhaust port 80, the valve chamber being connected with the air pipe 55 by a conduit 81. When the work support and work engaging member are to be moved toward the tool the valve 77 is moved to the position shown in Fig. 3 to admit air to the upper end of the cylinder, thus moving the piston 71 and rack bar 70a downwardly and thereby moving the slide bars 35 upwardly. The valve may be shifted in any suitable manner and, in the present construction, it is actuated by a finger 82 pivotally mounted on a fixed bracket 83 and rigidly connected with an actuating arm 84. The actuating arm is connected with a valve actuating member 85, the upper portion of which is tubular in form, as shown at 86 in Fig. 6, and extends upwardly through a bracket 87 rigidly secured to the upper end of the cylinder 70, which is fixed with relation to the supporting structure, through a bar 88 rigidly connected with the piston rod 72 and through a guide 89 at the upper end of the supporting structure. Mounted on the upper portion of the supporting structure is a hand piece 90 which is so connected with the valve rod 86 that a rearward thrust thereon, to the left in Fig. 3, will move the valve actuating device 85 and 86 downwardly and thus move the valve 77 to the position shown in Fig. 3, whereby the air under pressure is admitted to the upper end of the cylinder. The valve rod is locked in this lower position until the piston has completed its downward movement and is then released to permit the spring 79 to reverse the valve 77 and admit air to the cylinder below the piston and thus return the latter and the parts actuated thereby to their initial positions.

The means for locking and releasing the valve actuating mechanism may take various forms but preferably two locking members or dogs 100 are pivotally mounted on the lower side of the bracket 87 through which the valve rod extends and are so arranged that upon the downward movement of the valve rod the locking members 100 will be moved by springs 101 into engagement with a shoulder 102 at the lower end of the tubular portion of the rod, thus locking the latter. To automatically release the actuating rod from the locking device a tubular member 103 is arranged about the intermediate portion of the tubular rod 86, is slidably supported at its upper end in the bar 88 and is provided at its lower end with an enlargement 104 the reduced lower end portion 105 of which extends through the opening in the bracket 87, about the tubular rod. A spring 106 yieldably supports the tubular member 103 and the part 104 in an elevated position. Adjustably mounted on the tubular member 103 and preferably screw threaded thereon is a stop 107. As the piston approaches the lower end of the cylinder the bar 88, carried by the piston rod 72, contacts the stop 107, thereby moving the tubular structure 103 downwardly and causing the reduced lower portion 105 to engage the locking members 100 and move the same out of contact with the shoulder 102, thereby releasing the rod and permitting the spring 79 to move the valve rod 78 and the actuating rod 85—86 to normal positions, the locking members then moving into engagement with the lower portion of the valve rod.

There is also provided an emergency release for the actuating rod to enable the movement of the piston and therefore of the work engaging member and work support to be interrupted at any point in the downward travel of the piston. For this purpose the rod 108 is slidably mounted in the tubular member 103 and is provided at its upper end with a knob 109 by which it may be actuated and has near its lower end a cross pin 110, the end portions of which extend through slots 111 in the tubular rod 86 and are so arranged that a downward pressure on the knob 109 will cause the pin to engage a shoulder formed by the reduced portion of the structure 104 and thereby move that structure downwardly to actuate the locking members 100 and release the actuating rod and valve for movement to their normal positions.

To insure the uniform accurate operation of the tool on the work piece it is desirable that the work piece shall move at a predetermined uniform speed during the boring operation, that is, while the tool is in engagement with the work piece. For this purpose means are provided for retarding or slowing down the movement of the work piece during the boring operation and means is here shown as a retarding device, in the nature of a dash pot, which will become operative approximately at the time the work piece engages the tool. In the form shown, the retarding device comprises a cylinder 112 mounted on the supporting structure near the upper end thereof and having therein a piston 113 provided with a downwardly extending piston rod 114. The cylinder is provided in its lower end with a small vent the capacity of which may be adjusted by a screw 115 and which connects the lower portion of the cylinder with a fluid chamber 116 which is also connected by a conduit 117 with the upper end of the cylinder 112. The piston rod 114 extends loosely through the bar 88 carried by the piston rod 72 and has mounted thereon an adjustable stop 118, which is preferably threaded onto the piston rod. This stop 118 is so adjusted that at approximately the time the work piece engages the tool the bar 88 will engage the stop and move the piston 113 downwardly to force the oil or other fluid from the cylinder 112 through the vent into the receptacle 116, thereby retarding the movement of the piston 71 of the main actuating device.

When a work piece is to be operated on and the several parts of the mechanism are in their normal or idle positions the work support 32 will be spaced below the work engaging member 31 so that a work piece may be readily placed thereon. When the work piece is in position on the supporting member the hand piece 90 is presssed rearwardly to shift the valve 77 to a position to admit air to the upper end of the cylinder 70, thereby moving the piston 71 downwardly and causing the rack and pinion connection between the piston and the slide bars 35 which support the work engaging member and work support to move those members upwardly. The actuating rod for the valve 77 is automatically locked in its lower or operative position so that the hand piece may be released and the air will continue to enter the cylinder above the piston until the latter has substantially completed its downward movement. Upon the initial upward movement of the work engaging member the actuating device 45 for the work support also moves upwardly and carries the arm 64 out of engagement with the fixed member 65, thereby permitting the valve to move to a position to admit air to the cylinder below the piston 47, thus causing the work support to move the work piece into engagement with the work engaging member while the work support and its actuating device are being carried upwardly by the work engaging member, and to firmly hold the work piece in engagement with the work engaging member during the continued upward movement of the latter. After the work piece has been clamped tightly between the work support and the engaging member the retarding device becomes operative to slow down the movement of the work engaging device and the parts moving therewith, thus causing a relatively slow movement of the work piece during the boring operation. When the boring operation has been completed the valve actuating rod will be released from its locking devices 100 and the valve 77 reversed to cause the piston to move upwardly and thereby move the work engaging device, work support and actuating device 45 downwardly toward their initial positions. As the actuating device 45 approaches the lower limit of its movement the arm 64 engages the fixed stop 65 and reverses the valve 60 to admit air above the piston 47 and thus move the work support downwardly with relation to the work engaging member.

While I have shown and described one embodiment of my invention I wish it to be understood that I do not desire to be limited to the details thereof as various modifications may appear to a person skilled in the art.

Having now fully described my invention, what I claim as new and desire to secure by Letters Patent, is:

1. A boring machine comprising a supporting structure, a spindle mounted on said supporting structure for rotation about a vertical axis, held against axial movement with relation to said structure and having means for securing a tool to the lower end thereof, means for driving said spindle, a work engaging member movably supported on said structure below said spindle and having an opening to receive a tool on said spindle, a work support below said work engaging member, a cylinder, a piston in said cylinder having supporting connection with said work support, means for connecting said cylinder with a source of fluid under pressure to move said work support toward said engaging member and cause a work piece thereon to engage the latter, a second cylinder, a piston therein, means actuated by the last mentioned piston to move said engaging member and the first mentioned cylinder toward said spindle.

2. A boring machine comprising a supporting structure, a spindle mounted on said supporting structure for rotation about a vertical axis, held against axial movement with relation to said structure and having means for securing a tool to the lower end thereof, means for driving said spindle, vertically movable slide bars mounted on said structure, a work engaging member secured to said bars and extending beneath said spindle, a cylinder below said engaging member and connected thereto for movement therewith, a piston in said cylinder, a work support connected with said piston for movement thereby to cause a work piece thereon to engage said engaging member, a second cylinder supported on said structure, a piston in said second cylinder, an operative connection between the last mentioned piston and said slide bars to move said engaging member and the first mentioned cylinder toward said spindle, and means controlled by said movement of said first mentioned cylinder to admit fluid under pressure thereto and move said work support toward said work engaging member to cause the work piece thereon to engage the latter.

3. A boring machine comprising a supporting structure, a spindle mounted on said supporting structure for rotation about a vertical axis, held against axial movement with relation to said structure and having means for securing a tool to the lower end thereof, means for driving said spindle, vertically movable slide bars mounted on said structure, a work engaging member secured to said bars and extending beneath said spindle, a cylinder below said engaging member and connected thereto for movement therewith, a piston in said cylinder, a work support connected with said piston for movement thereby to cause a work piece thereon to engage said engaging member, a second cylinder supported on said structure, a piston in said second cylinder, an operative connection between the last mentioned piston and said slide bars to move said engaging member and the first mentioned cylinder toward said spindle, means controlled by said movement of said first mentioned cylinder to admit fluid under pressure thereto and move said work support toward said work engaging member to cause the work piece thereon to engage the latter, and means to retard the movement of said engaging member after said work piece has engaged the same.

4. A boring machine comprising a supporting structure, a spindle mounted on said supporting structure for rotation about a vertical axis, held against axial movement with relation to said structure and having means for securing a tool to the lower end thereof, means for driving said spindle, a work engaging member movably supported beneath said spindle, a cylinder fixed with relation to said supporting structure, a piston in said cylinder, means connected with said piston for moving said engaging member toward and from said spindle, manually controlled means to admit fluid under pressure to said cylinder on one side of said piston, to move said engaging member toward said spindle, means controlled by the movement of said piston to admit fluid under pressure to said cylinder on the other side of said piston, a second cylinder below said engaging member and connected thereto for movement therewith, a piston in said second cylinder, a work support connected with the last mentioned piston for movement therewith, and means controlled by the movement of said second cylinder with said engaging member to admit fluid under pressure to said second cylinder on one side of said piston to move said work support toward said engaging member and for admitting fluid to said second cylinder on the other side of said piston to retract said work support.

5. A boring machine comprising a supporting structure, a spindle mounted on said supporting structure for rotation about a vertical axis, held against axial movement with relation to said structure and having means for securing a tool to the lower end thereof, means for driving said spindle, a work engaging member movably supported beneath said spindle, a cylinder fixed with relation to said supporting structure, a piston in said cylinder, means connected with said piston for moving said engaging member toward and from said spindle, manually controlled means to admit fluid under pressure to said cylinder on one side of said piston to move said engaging member toward said spindle, means controlled by the movement of said piston to admit fluid under pressure to said cylinder on the other side of said piston, a second cylinder below said engaging member and connected thereto for movement therewith, a piston in said second cylinder, a work support connected with the last mentioned piston for movement therewith, means controlled by the movement of said second cylinder with said engaging member to admit fluid under pressure to said second cylinder on one side of said piston to move said work support toward said engaging member and for admitting fluid to said second cylinder on the other side of said piston to retract said work support, and adjustable means controlled by the movement of the first mentioned piston to retard the movement of said engaging member after a work piece on said work support has been moved into engagement therewith by the last mentioned piston.

6. A boring machine comprising a supporting structure, a spindle mounted on said supporting structure for rotation about a vertical axis, held against axial movement with relation to said structure and having means for securing a tool to the lower end thereof, means for driving said spindle, a work engaging member supported below said spindle for movement toward and from the latter, a work support below said engaging member, an actuating device for moving said work support toward and from said engaging member, said actuating device being connected with said engaging member for movement therewith, a cylinder fixed with relation to said supporting structure, a piston in said cylinder, means connected with said piston to actuate said engaging member, means including a valve to control the admission of fluid under pressure to said cylinder, means including a rod to actuate said valve, a guide for said actuating rod fixed with relation to said cylinder, a locking device beneath said guide to lock said actuating rod against reverse movement, a tubular element supported about said actuating rod above said guide for movement with relation to said rod and having a part movable beyond said guide to engage said locking device and move the latter to an inoperative position, and means connected with said piston to impart said releasing movement to said tubular element and release said actuating rod when said piston closely approaches the lower limit of its movement.

7. A boring machine comprising a supporting structure, a spindle mounted on said supporting structure for rotation about a vertical axis, held against axial movement with relation to said structure and having means for securing a tool to the lower end thereof, means for driving said spindle, a work engaging member supported below said spindle for movement toward and from the latter, a work support below said engaging member, an actuating device for moving said work support toward and from said engaging member, said actuating device being connected with said engaging member for movement therewith, a cylinder fixed with relation to said supporting structure, a piston in said cylinder, means connected with said piston to actuate said engaging member, means including a valve to control the admission of fluid under pressure to said cylinder, means including a tubular rod to actuate said valve, a guide for said actuating rod fixed with relation to said cylinder, a locking device beneath said guide to lock said actuating rod against reverse movement, a tubular element supported about said actuating rod above said guide for movement with relation to said rod and having a part movable beyond said guide to engage said locking device and move the latter to an inoperative position, means connected with said piston to impart said releasing movement to said tubular element and release said actuating rod when said piston closely approaches the lower limit of its movement, and a manually operable rod extending through said actuating rod, movable with relation thereto and having means for imparting lock releasing movement to said tubular element while said actuating rod is stationary.

GEORGE H. LELAND.

REFERENCES CITED

The following references are of record in the file of this patent:

UNITED STATES PATENTS

| Number | Name | Date |
|---|---|---|
| 1,261,432 | Parslow | Apr. 2, 1918 |
| 1,510,771 | English | Oct. 7, 1924 |
| 1,812,533 | Hunt | June 30, 1931 |
| 2,154,038 | Evrell | Apr. 11, 1939 |
| 2,326,498 | Rodal | Aug. 10, 1943 |
| 2,380,314 | Kavle | July 10, 1945 |